United States Patent [19]
Citta

[11] Patent Number: 5,132,797
[45] Date of Patent: Jul. 21, 1992

[54] CO-CHANNEL INTERFERENCE FILTER FOR DIGITAL HIGH DEFINITION TELEVISION RECEIVER

[75] Inventor: Richard W. Citta, Oak Park, Ill.

[73] Assignee: Zenith Electronics Corporation, Glenview, Ill.

[21] Appl. No.: 600,469

[22] Filed: Oct. 19, 1990

[51] Int. Cl.⁵ ............................................. H04N 5/213
[52] U.S. Cl. ...................................... 358/167; 375/101; 375/103
[58] Field of Search ................ 358/186, 188, 197, 167, 358/141, 12, 83, 31; 455/295, 296, 210, 307, 308, 63; 375/101, 18, 103

[56] References Cited

U.S. PATENT DOCUMENTS

| | | | |
|---|---|---|---|
| 4,032,847 | 6/1977 | Unkauf | 375/101 |
| 4,343,019 | 8/1982 | Lagoni | 358/31 |
| 4,353,093 | 10/1982 | Durbin, Jr. et al. | 358/31 |
| 4,646,153 | 2/1987 | Fukuda et al. | 375/103 |
| 4,739,518 | 4/1988 | Bickley et al. | 455/308 |
| 4,951,146 | 8/1990 | Citta | 358/186 |
| 4,953,183 | 8/1990 | Bergmans et al. | 375/101 |
| 4,961,108 | 10/1990 | Perlman | 358/31 |
| 4,974,064 | 11/1990 | Tsinberg | 358/12 |
| 4,999,701 | 3/1991 | Cavallerano et al. | 358/12 |
| 5,005,184 | 4/1991 | Amano et al. | 375/101 |

OTHER PUBLICATIONS

Lothian, "Comb Filter for Suppression of Co-Channel Interference on TV Signals", Jul. 1978, pp. 121-134.

*Primary Examiner*—James J. Groody
*Assistant Examiner*—Jeffrey S. Murrell

[57] ABSTRACT

A high definition television system includes a transmitter and receiver pair in which the receiver includes a co-channel interference filter having a comb filter and an intersymbol interference filter. The frequency response of the comb filter is selected to attenuate NTSC co-channel interference signals. The response of the intersymbol interference signal filter is selected to provide cancellation of the intersymbol interference signals produced by the comb filter.

17 Claims, 3 Drawing Sheets

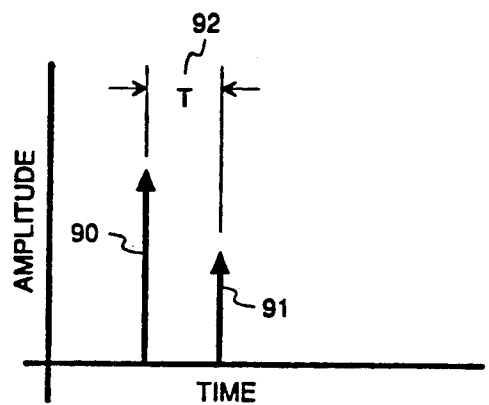
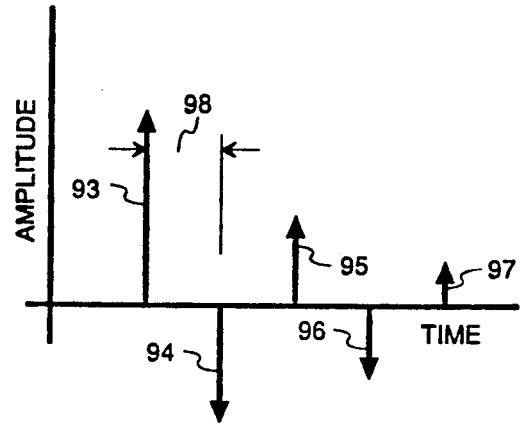
Fig. 4
Fig. 5
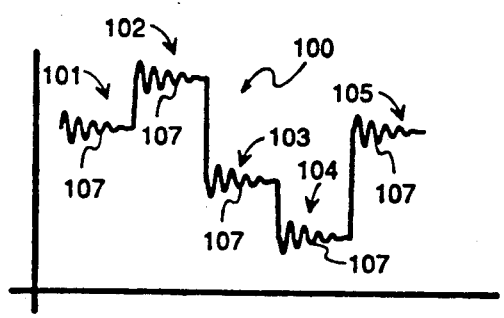
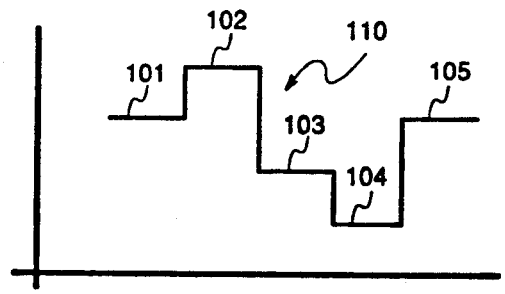
Fig. 6
Fig. 7

CO-CHANNEL INTERFERENCE FILTER FOR DIGITAL HIGH DEFINITION TELEVISION RECEIVER

FIELD OF THE INVENTION

This invention relates generally to high definition television receivers and particular to those receiving digitally encoded high definition television signals.

BACKGROUND OF THE INVENTION

The standard NTSC color television broadcast system adopted in the United States by the Federal Communications Commission provides a six megahertz bandwidth for each television broadcast channel. Within this six megahertz bandwidth, broadcasters must provide video, color and sound information together with several synchronizing signals. The latter are required to enable the television receiver to properly display the picture information as originally modulated at the transmitter.

The use of conventional information processing by television broadcast and receiving systems involves the modulation of analog information signals upon one or more carrier signals for broadcast. This analog signal processing together with the limited bandwidth available for each television broadcast channel limits the maximum frequency response of picture information which may be transmitted and received. This limited frequency response results in a limitation of the resolution or picture definition of the displayed television picture. Within these constraints, manufacturers of television receivers have adopted a variety of picture information processing and display techniques to enhance the perceived definition or resolution of the displayed television picture.

While the effort by television manufacturers to provide such enhanced resolution has provided considerable improvement, there exists a continuing desire to further improve television picture quality. This continuing desire has motivated practitioners in the television arts to undertake the development of a variety of high definition television systems. One of the fundamentals applied to such high definition television system development is the need to process higher frequency picture information. One possible solution involves expanding the available bandwidth of the television broadcast channels. While such a system is technologically direct, its implementation is considered impractical given the proliferation of standard NTSC signal stations and television receivers. Another possible approach involves compressing a wideband video signal while maintaining the present six megahertz broadcast channel bandwidth. In this regard, transmission of the compressed signal in digital form is generally preferred since improved noise performance is provided relative to conventional analog transmission. That is, any noise picked up in the digital transmission of the encoded signals will not be reproduced if the discrete levels of the digital transmission can be accurately resolved in the receiver. However, in digital transmission, excessive noise or interference can result in total loss of picture if the digital levels cannot be resolved, in contrast to analog where the picture is gradually degraded.

While the structures of high definition television systems may vary, a typical wideband system uses a high frequency analog video source having a bandwidth in excess of thirty megahertz for picture information. The broad bandwidth video information is converted from analog to digital information by conventional analog to digital conversion. Thereafter, digital signal processing techniques are utilized to perform one or more data compression operations to provide a signal capable of being digitally transmitted within the available six megahertz bandwidth. This digitally encoded signal is used to modulate an assigned television broadcast carrier.

At the receiver, a generally conventional tuner, intermediate frequency amplifier, and picture detector recover the digitally encoded signal in much the same manner as a conventional NTSC receiver. Thereafter, decompression systems produce a representation of the original compressed signal afterwhich a digital to analog converter converts the digitally encoded signal to a wideband analog picture information signal. This analog signal is then processed for display upon a high resolution television display such as a cathode ray tube.

Such high definition television systems will, of course, be incompatible with standard NTSC systems. Because of the great number of NTSC television receivers presently installed and in use, it is likely that the implementation of such high definition television systems will be carried forward in a manner which avoids disturbing FCC allocation of existing NTSC services. One of the most likely approaches to making high definition television available involves assigning presently unused television broadcast channels to high definition television broadcasting. Through the years, the Federal Communications Commission has endeavored to avoid assigning the same television broadcast channels to broadcasters operating in potentially overlapping television service areas. As a result, most areas in the United States have a number of unused television channels available. However, the assignment of such channels to high definition television broadcasters will increase the likelihood of closely spaced or overlapping broadcast areas. In such areas, television receivers may be subjected to two different television broadcast signals on the same broadcast channel. The result of simultaneous reception of two different signals within the same broadcast channel produces an interference problem within the receiver known as co-channel interference. High definition television receivers receiving digitally transmitted signals may be subject to stronger interference signals than receivers receiving NTSC signals and as a result such co-channel interference signals are likely to severly degrade or even disrupt the operation of the high definition television receivers.

Since the channel selection tuning mechanisms used in television receivers provide channel selection based upon signal frequency, even the best tuner may not exclude an undesired co-channel signal. There arises, therefore, a need in the art for an effective means for reducing co-channel interference, especially in digital high definition television system receivers.

Accordingly, it is a general object of the present invention to provide an improved high definition television receiver. It is a more particular object of the present invention to provide an improved high definition television receiver capable of reducing the effects of NTSC co-channel interference without significantly degrading the performance of the receiver.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIGS. 4 and 5 set forth impulse response diagrams of portions of the present invention co-channel interference filter;

FIG. 5 sets forth an exemplary input data signal for the present invention co-channel interference filter;

FIG. 6 sets forth an exemplary output signal of the present invention co-channel interference filter; and FIG. 7 sets forth an exemplary output signal of the present invention co-channel interference filter from which noise has been removed.

DESCRIPTION OF THE PREFERRED EMBODIMENT

Figure 1:
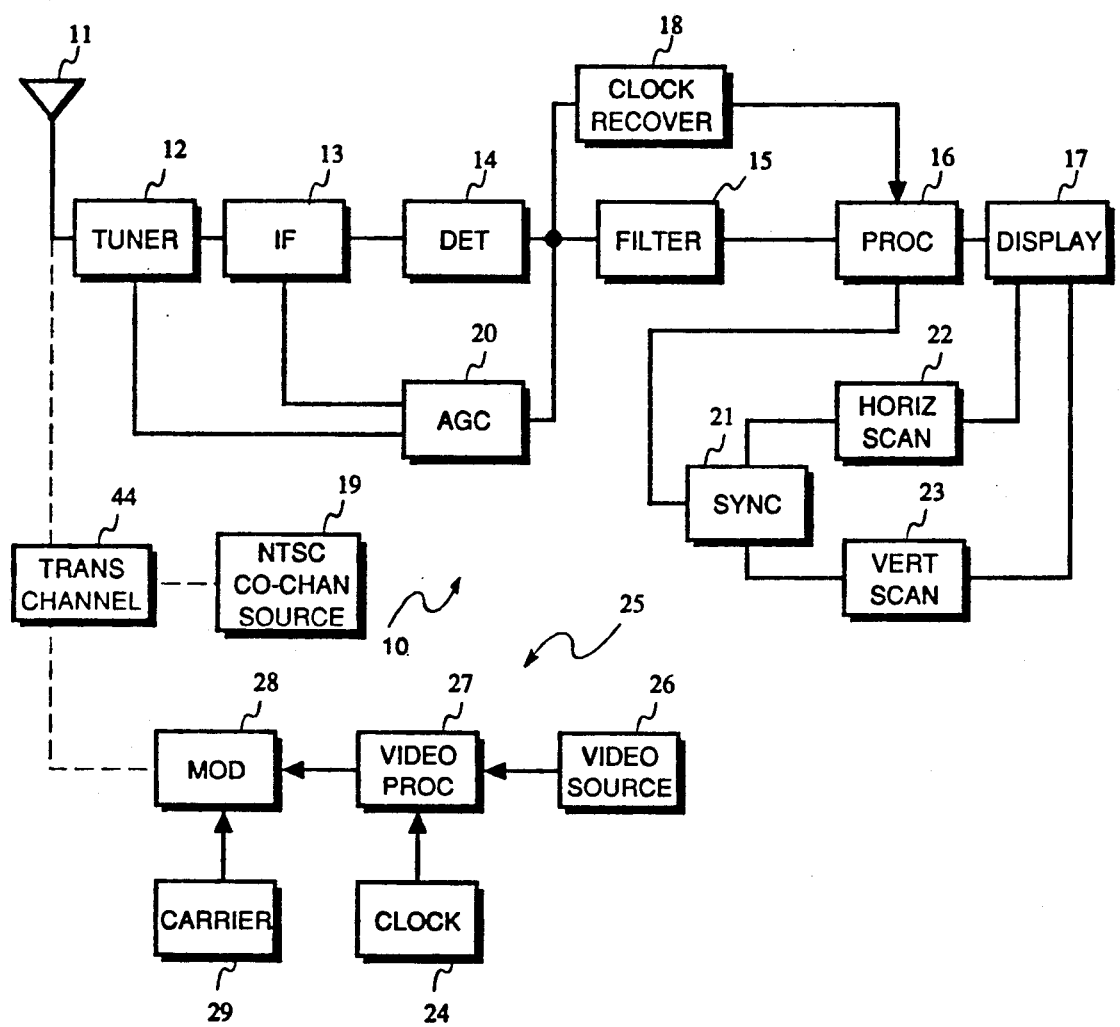
FIG. 1 sets forth a block diagram of a high definition television system having a high definition television receiver constructed in accordance with the present invention.

FIG. 1 sets forth a block diagram of a high definition television system and a high definition television receiver constructed in accordance with the present invention with the latter being generally reference by numeral 10.

A source of video information 26, which may for example include a high definition video camera, is coupled to a video processor 27. A clock 24 produces a periodic clock signal which is also coupled to video processor 27. The output of video processor 27 is coupled to one input of a modulator 28. A source of carrier frequency signal 29 is coupled to the remaining input of modulator 28. The output of modulator 28 is coupled to a transmission channel 44. Transmission channel 44 may, for example, comprise an over the air broadcast channel or a cable system.

In operation, video processor 27 responds to the clock signal from clock 24 to process the video information from video source 26, processed video information being provided as a four-level digitally encoded signal which is then modulated upon the carrier signal from source 29 by modulator 28. A sample of the clock signal from clock 24 is also included in the output signal of processor 27. As will be seen below, this sample permits the establishment of a corresponding clock signal within receiver 10. The resulting modulated station carrier is then applied to transmission channel 44.

Receiver 10 includes an antenna 11 receiving signals from transmission channel 44 and being coupled to a tuner 12. Tuner 12 is coupled to an intermediate frequency amplifier 13, the output of which is coupled to a detector 14. The output of detector 14 is coupled to an automatic gain control 20, the outputs of which are coupled to tuner 12 and intermediate frequency amplifier 13. A filter 15 constructed in accordance with the present invention and set forth below in greater detail couples the output of detector 14 to a signal processor 16. Processor 16 is coupled to a display system 17 and to a synchronizing system 21. A horizontal scan system 22 and a vertical scan system 23 are coupled to display system 17 and to synchronizing system 21.

In operation, the four-level digitally encoded high definition television signal produced by modulator 28 is coupled by transmission channel 44 to antenna 11. A source of NTSC co-channel interference signals 19 is shown coupled to transmission channel 44 to depict the introduction of an NTSC co-channel signal. The interfering co-channel signal becomes mixed with the desired digitally encoded high definition signal produced by modulator 28. The received signal at antenna 11 comprising both the desired signal and the interfering NTSC co-channel signal is frequency converted by tuner 12 to an intermediate frequency signal which is amplified by a plurality of tuned amplifiers within intermediate frequency amplifier 13 to a power level sufficient to drive detector 14. Detector 14 recovers the digitally encoded modulating signal from the intermediate frequency signal and applies it to filter 15. In addition, the recovered digitally encoded signal includes an amplitude reference signal which is processed by automatic gain control 20 to control the gains of tuner 12 and intermediate frequency amplifier 13 to maintain a generally constant signal amplitude at detector 14.

Because interfering co-channel signals are also detected by detector 14, the present invention receiver provides a filter 15 which in accordance with the operation set forth below in greater detail, is operative upon the detected digitally encoded signal produced by detector 14 to remove any co-channel interference signal and apply the filtered signal to signal processor 16. Processor 16 performs the necessary decompression process and digital to analog conversion to convert the digitally encoded input signal to a high frequency analog picture information signal suitable for display by display system 17. In its preferred form, display system 17 may include a high resolution cathode ray tube and appropriate display amplifiers. Horizontal scan 22 and vertical scan 23 provide sequential raster scanning of the cathode ray tube within display 17. Synchronizing system 21 receives a plurality of synchronizing signals from processor 16 and in response thereto properly times or synchronizes the operations of horizontal scan 22 and vertical scan 32.

Figure 2:
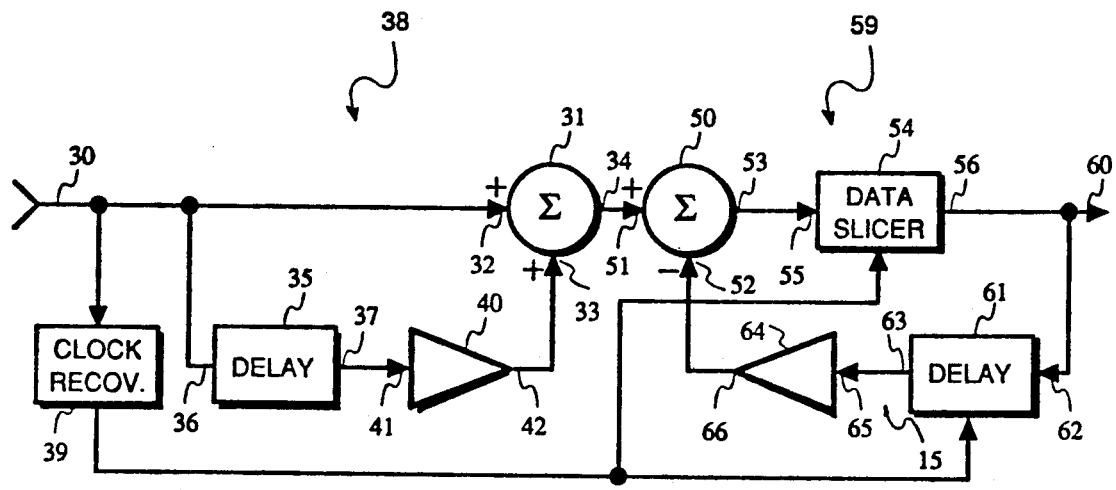
FIG. 2 sets forth a block diagram of the present invention co-channel interference filter.

FIG. 2 sets forth a block diagram of filter 15 constructed in accordance with the present invention. Filter 15 comprises a series combination of a comb filter 38 and an intersymbol interference filter 59. Comb filter 38 is operative to reduce the co-channel interference signal at input 30. However, during this co-channel signal reduction, an undesired intersymbol interference signal is produced within comb filter 38. Intersymbol interference filter 59 is operative to remove this intersymbol interference signal. Comb filter 38 includes a summer network 31 having a positive input 32 coupled to a data input 30, a positive input 33, and an output terminal 34. A delay network 35 has an input 36 coupled to data input terminal 30 and an output 37. An amplifier 40 has an input 41 coupled to output 37 of delay network 35 and an output 42 coupled to positive input 33 of summer 31.

Intersymbol interference filter 59 includes a summer 50 having a positive input 51 coupled to output 34 of summer 31, a negative input 52, and an output 53. A data slicer 54 has an input 55 coupled to output 53 of summer 50 and an output 56 coupled to a data output terminal 60. A delay network 61 has an input 62 coupled to output 56 of data slicer 54 and an output 63. An amplifier 64 has an input 65 coupled to output 63 of delay network 61 and an output 66 coupled to negative input 52 of summer 50. Data input 30 is coupled to detector 14 (seen in FIG. 1) while data output 60 is coupled to processor 16 (also seen in FIG. 1). A clock recovery circuit 39 is coupled to input 30 and produces a clock signal corresponding to clock 24 within the station transmitter which is coupled to delay 61 and data slicer 54.

In operation, comb filter 38 and intersymbol interference filter 59 combine to first attenuate the co-channel interference signal and thereafter remove the intersymbol interference signal produced by comb filter 38. Specifically, the digitally encoded data input signal at terminal 30 is applied directly to input 32 of summer 31 and to delay network 35. Because the anticipated co-channel interference signal sought to be reduced by filter 15 is an NTSC signal and thus exhibits the above-mentioned energy clustering at the NTSC periodicity, delay 35 is selected to produce a signal delay precisely equal to a selected NTSC periodicity characteristic. For example, delay 35 may be selected to correspond to the time interval of a horizontal scan period, a vertical scan period, or a vertical frame interval. In any event, the delay thus selected frequency spaces the nulls of the comb filter response (shown in FIG. 3) in a frequency spacing corresponding to the clustering of the NTSC co-channel signal. To maximize the effectiveness of comb filter 38, carrier source 29 (seen in FIG. 1) is frequency offset from the standard channel frequency by an odd multiple of one half the selected NTSC periodicity. The delayed signal is amplified by amplifier 40 and applied to input 33 of summer 31. To maintain stability of filter 15 and prevent undesired oscillations, the gain of amplifier 40 is chosen to produce a feed forward gain of less than one. The input signals at inputs 32 and 33 are added in summer 31 and coupled to input 51 of summer 50. Summer 31, delay network 35 and amplifier 40 form a comb filter network having the frequency response set forth in FIG. 3.

Figure 3:
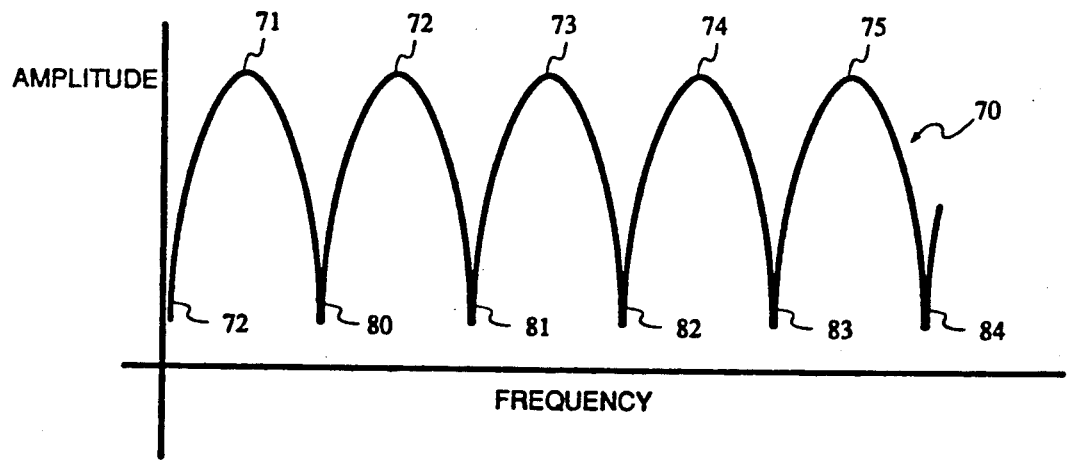
FIG. 3 sets forth a filter response curve for a portion of the present invention co-channel interference filter.

With temporary reference to FIG. 3, the frequency response of the comb filter formed by summer 31, delay 35 and amplifier 40 is set forth as curve 70. Curve 70 defines a conventional comb filter response characterized by a plurality of peak responses 71, 72, 73, 74 and 75 and interleaved nulls 80, 81, 82, 83 and 84. It should be apparent to those skilled in the art that FIG. 3 sets forth a representative frequency response which theoretically continues indefinitely beyond null 84. In addition, the relative difference in response amplitude of curve 70 between peak responses 71 through 75 and nulls 80 through 84 is determined in part by the gain of amplifier 40. As amplifier 40 approaches a signal gain of one, nulls 80 through 84 approach their maximum attenuation with respect to peak amplitudes 71 through 75. When the above-described frequency offset of carrier source 29 (seen in FIG. 1) is maintained, the energy clusters of the interfering NTSC signal tend to coincide with the nulls of the comb filter response and are, as a result, substantially attenuated.

Returning to FIG. 2, the output signal of the comb filter formed by summer 31, delay 35 and amplifier 40 is applied to input 51 of summer 50. The output of summer 50 is coupled to data slicer 54 and processed therein in accordance with the four level input data system described below in connection with FIGS. 6 and 7. Suffice it to note here, however, that the comb filtered data signal is further coupled to output terminal 60 by data slicer 54. In addition, the output signal of data slicer 54 is fed back to negative input 52 of summer 50 by the series combination of delay 61 and amplifier 64. Delay 61 is selected to provide a signal delay equal to that of delay 35 which, as is mentioned above, is precisely equal to one interval of the selected NTSC periodicity. To facilitate this precise delay, the frequency of clock 24 (seen in FIG. 1) and the clock signal produced by clock recovery 39 is precisely maintained at a multiple of the selected NTSC periodicity. The gain of amplifier 64 is selected in accordance with the criteria set forth below.

To prevent the circulation of noise within filters 38 and 59, delays 35 and 61 are configured as filters having noise bandwidths less than a television channel bandwidth. For example, delays 35 and 61 may have noise bandwidths of approximately three megahertz (ie one-half of six megahertz).

FIG. 4 sets forth the impulse response of comb filter 38 as can be seen by examination of FIG. 4. Comb filter 38 responds to the input data signal by producing an output having the input data signal 90 together with an intersymbol interference signal 91. As can also be seen in FIG. 4, intersymbol interference signal 91 is reduced in amplitude from data input signal 90 and delayed in time by a time interval 92. In accordance with the characteristics of a comb filter of the type formed by comb filter 38, time delay 92 corresponds to the delay interval of time delay 35. Because most of the energy of NTSC signals is centered at the nulls of the comb filter response, comb filter 38 substantially attenuates the NTSC co-channel interference. While comb filter 38 is effective to substantially reduce or eliminate NTSC co-channel interference, its comb filter characteristic also produces an undesired intersymbol interference signal 91. This intersymbol interference signal is removed by filter 59.

FIG. 5 sets forth the impulse response of filter 59. As can be seen, filter 59 in response to an input data signal 93 produces a negative replica 94 of intersymbol interference signal 91 produced by filter 38. Negative replica 94 cancels intersymbol interference signal 91. Filter 59 also produces a diminishing series of alternating polarity replicas of intersymbol interference signal 91 shown as response components 95, 96 and 97. Thus, in accordance with the invention, the series combination of filters 38 and 59 permits the response of filter 59 to effectively cancel the intersymbol interference signal 91 created by filter 38. As a result, the overall response of filters 38 and 59 is substantially free of both NTSC co-channel interfering signals and intersymbol interfering signals.

FIG. 6 sets forth a four level input data signal of the type normally processed by a high definition television receiver and generally referenced by numeral 100. Signal 100 includes successive signal components 101, 102, 103, 104 and 105 at various data signal levels. Signal components 101 and 105 are shown at the same data signal level. A noise component 107 is also shown riding upon signal 100. When a signal of the type shown as waveform 100 in FIG. 6 is applied to input 30 of filter 15, the output signal of filter 38 will comprise the combination of waveform 100, an intersymbol interference signal in its delayed and attenuated form, and signal noise. This filter output signal is applied to data slicer 54 which resolves the signal into a corresponding four state signal shown in FIG. 7 and generally referenced by numeral 110. Signal 110 is delayed and attenuated by delay 61 and amplifier 64 and subtracted from the input signal at input 51 of summer 50 to provide cancellation of the intersymbol interfering signal. Because noise signal 107 is not resolved by data slicer 54, a clean output signal is produced at output 60 which is relatively free of NTSC co-channel interference signals, intersymbol interference signals, and noise.

It will be apparent to those skilled in the art that while the system set forth herein utilizes a four level data signal, the present invention co-channel interference filter may be utilized in other digital systems using other digital encoding formats.

What has been shown is a co-channel interference filter for high definition television receivers which substantially reduces NTSC co-channel interference without degrading receiver performance. The system shown is capable of application to numerous types of digital processing formats for high definition television receivers. The system shown is relatively inexpensive and may be readily fabricated in an integrated circuit or the like.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a television receiver, a co-channel interference filter comprising:
   means for receiving a digitally encoded television signal transmitted over a selected television channel, said signal including an interfering co-channel television signal having a plurality of periodic signal components;
   a filter coupled to said means for receiving, said filter having a response selected for reducing said interfering co-channel television signal and for producing an output signal including an intersymbol interference signal component in response to said digitally encoded signal; and
   an intersymbol interference signal filter coupled to said filter, said intersymbol interference signal filter having a response for reducing the intersymbol interference signal component of said output signal for reconstructing said digitally encoded signal.

2. A co-channel interference filter as set forth in claim 1 wherein said intersymbol interference signal filter includes:
   a summer having a positive input coupled to said filter, a negative input and a summer output;
   a digital signal data slicer coupled to said summer output; and
   a feedback network coupled between said digital signal data slicer and said negative input of said summer.

3. A co-channel interference filter as set forth in claim 2 wherein said feedback network includes first delay means and an amplifier.

4. A co-channel interference filter as set forth in claim 3 wherein said filter comprises a comb filter including second delay means having a time delay equal to the period of a selected one of the periodic signals in the interfering co-channel television signal.

5. A co-channel interference filter as set forth in claim 4 wherein said first delay means has a time delay equal to said second delay means.

6. For use in a television receiver, a co-channel interference filter comprising:
   means for receiving a digitally encoded television signal transmitted over a selected television channel, said signal including an interfering co-channel television signal having a plurality of periodic signal components;
   a comb filter having a first two input summer having one input coupled to said means for receiving and a first delay network and first amplifier serially coupled between said means for receiving and the other first summer input, said first delay network having a delay equal to the period of a selected one of said periodic signals;
   an intersymbol interference filter having a second two input summer having a negative input, a positive input coupled to said first two input summer, an output, and a second delay network and a second amplifier serially coupled between said output and said negative input, said second delay network having a delay equal to that of said first delay network; and
   a multiple level digital signal data slicer coupled to said output of said second summer for slicing the digitally encoded signal into a multiple level data signal.

7. A method of reducing the amplitude of a co-channel interference signal in a television receiver comprising the steps of:
   receiving a digitally encoded television signal and an interfering co-channel signal at a selected television broadcast channel;
   comb filtering the received digitally encoded television signal and interfering co-channel signal for providing an output signal having a reduced level of interfering co-channel signal and being characterized by an intersymbol interference component; and
   filtering the output signal to reduce the intersymbol interference component.

8. The method of claim 7 wherein said filtering step includes the steps of:
   providing an inverse representation of the intersymbol interference component; and
   combining the inverse representation with the output signal.

9. The method of claim 8 wherein said comb filtering step includes:
   delaying the digitally encoded television signal for a delay interval selected to equal a selected period of an NTSC broadcast signal; and
   combining the delayed signal with the digitally encoded television signal.

10. The method of claim 9 wherein said delay interval of said delaying step is the period of the NTSC horizontal scan signal.

11. The method of claim 9 wherein said delay interval of said delaying step is the period of the NTSC vertical scan signal.

12. The method of claim 9 wherein said delay interval of said delaying step is the period of an NTSC frame.

13. A method of reducing the amplitude of a co-channel interference signal having one or more periodicities in a television receiver comprising the steps of:

transmitting a digitally encoded television signal modulated upon a broadcast channel frequency offset from the standard channel frequency by an odd multiple of one half the frequency of a selected periodicity of the co-channel interference signal;

receiving a digitally encoded television signal and an interfering co-channel signal at a selected television broadcast channel;

comb filtering the received digitally encoded television signal and interfering co-channel signal for providing an output signal having a reduced level of interfering co-channel signal and being characterized by an intersymbol interference component; and filtering the output signal to reduce the intersymbol interference component.

14. The method of claim 13 wherein said interfering co-channel signal is an NTSC signal and wherein said comb filtering step includes:

delaying the digitally encoded television signal for a delay interval selected to equal a selected period of an NTSC broadcast signal; and combining the delayed signal with the digitally encoded television signal.

15. The method of claim 14 wherein said delay interval of said delaying step is the period of the NTSC horizontal scan signal.

16. The method of claim 14 wherein said delay interval of said delaying step is the period of the NTSC vertical scan signal.

17. The method of claim 14 wherein said delay interval of said delaying step is the period of an NTSC frame.

* * * * *